Patented Nov. 15, 1927.

1,649,782

UNITED STATES PATENT OFFICE.

FRANK G. BREYER, OF PALMERTON, AND CLAYTON W. FARBER, OF BOWMANSTOWN, PENNSYLVANIA, ASSIGNORS TO THE NEW JERSEY ZINC COMPANY, OF NEW YORK, N. Y., A CORPORATION OF NEW JERSEY.

COMPOUNDED RUBBER.

No Drawing. Application filed July 27, 1921. Serial No. 487,988.

This invention relates to improvements in the manufacture of compounded rubber and has for its object the provision of an improved compounded rubber and the provision, as a new article of manufacture, of an improved reinforcing agent for compounded rubber.

Compounded rubber is manufactured by vulcanizing (for the appropriate period of time and at the appropriate temperature to secure the optimum cure) a mixture of crude or raw rubber with a suitable filler or reinforcing agent and a vulcanizing agent. Sulfur is the ordinary vulcanizing agent. Various accelerators (such as hexamethylenetetramine, diphenylthiourea, thiocarbanilide, aniline, etc.) may also be added as accelerators to hasten the time of cure or to improve the quality of the cure.

Crude, unreinforced rubber, when cured with the proper amount of sulfur, has a low resistance to abrasive wear and is totally unsuited for many uses, and in particular for use as a vehicle tire tread stock. A large number of compounding ingredients (generally referred to in the art as pigments) have heretofore been used in the rubber industry, both as fillers and as reinforcers. The common ground or pulverized, pigments, such as barytes, whiting, asbestine, silex, infusorial earth, and the like, have very little if any value as reinforcers against abrasion in rubber, and may be classed as true fillers. Finer pigments produced by wet precipitation, such as magnesium carbonate and lithopone, or by wet natural disintegration, such as clay, have some value as reinforcers against abrasion in rubber, particularly if the coarser particles are removed or differentially separated. The very fine fumed pigments, such as zinc oxide and carbon gas black, exhibit to a very marked degree the property of imparting abrasive resistance to rubber.

The reinforcing power in rubber of a substance is influenced by both the fineness of its particle size and its chemical composition, and up to the present time it has been found impossible to accurately evaluate the relative importance of the physical properties of a rubber reinforcer (say, for example, zinc oxide) as against its chemical properties. That both properties play a part in determining the rubber reinforcing power of a substance is, however, well recognized by rubber technologists.

Zinc oxide has long been extensively used in the rubber industry as a reinforcing agent, and its use in this connection enables the production of a very satisfactory rubber compound from the standpoint of resistance to abrasive wear. While gas black is also a very satisfactory rubber reinforcer (being the equal if not the superior of zinc oxide with respect to its property of imparting to compounded rubber resistance to abrasive wear), compounded rubber reinforced with gas black is always black or dark colored, and on this account the use of gas black as a rubber reinforcer is frequently objectionable if not prohibitive. Moreover, gas black is a difficult and objectionable substance to handle in a rubber mill where, because of its light fluffy nature, it flies about causing great annoyance. However, a more serious objection to the use of gas black as a rubber reinforcer is the fact that the resulting compounded rubber heats up to a relative large extent during extension and retraction.

Of the ingredients heretofore commonly used as reinforcers in compounding rubber, the most satisfactory from the standpoint of resistance to abrasive wear, as far as we are aware, are fumed products, such as zinc oxide and gas black. Such fumed products are made by a more or less complete combustion of gases with air resulting in the formation of fine particles of solids. It is our belief that the success of such fumed products as rubber reinforcers is due in large measure to the fact that the average particle size of such fumed products is generally smaller than the average particle size of rubber reinforcing substances heretofore produced by other methods.

The number and availability of substances which may be fumed, sublimed or generated by more or less complete combustion of gases is quite limited, and there have been many efforts to produce substances of similar fine particle size by other methods, such as by precipitation from solution. It has been recognized in the literature that fine particles of solids may be formed by precipitation from solutions, but, as far as we are aware, it has not heretofore been possible to recover such precipitates in a usable form and still retain a degree of fineness of the particles comparable with that of the aforementioned fumed products. Thus, while particles of extreme fineness may undoubtedly be initially formed by precipitation from solutions, these initially fine particles rapidly grow in size before they can be practically removed from the medium in which they are precipitated, and, in certain instances, the precipitate, after its removal from the precipitating medium, must, in order to adapt it for particular uses, be subjected to subsequent treatment of such a nature as tends to increase the size of the particles.

The production of a fine particle size reinforcing agent by precipitation from solution has, we believe, been heretofore impossible of achievement by commercially practical methods because of the lack of a science and art which could treat in any kind of quantitative way particles of the order of magnitude involved. We have conducted extensive investigations and researches with the view of determining with accuracy the actual size of particles of the order of magnitude of the particles of the aforementioned fumed products as well as the influence of particle size upon the properties of various substances as rubber reinforcers. As a result of these investigations and researches, we have determined certain factors and conditions influencing the particle size of dried chemical precipitates, and we have discovered a method of producing dried chemical precipitates of a particle size smaller or finer than the particle size of the present day best grades of rubber reinforcing zinc oxide.

The present invention contemplates the provision, as a new article of manufacture for use in reinforcing rubber, of dried, uncalcined coprecipitated zinc sulfide and barium sulfate. For the purposes of comparison and identification, we have herein taken the New Jersey Zinc Company's Special Grade Horsehead Brand zinc oxide as an example of an especially high grade rubber reinforcing zinc oxide. The Horsehead Brand of zinc oxide has been most extensively used in the rubber industry for many years, and the Special Grade has been the accepted standard of uniformity in zinc oxide for rubber compounding over a number of years. This zinc oxide has been made for many years by the well-known American or Wetherill process from the unique Franklinite ore of the Franklin mine in New Jersey, U. S. A. The properties and uniformity of this oxide are well recognized and are referred to in standard authorities on pigments. This zinc oxide has a particle size of about 0.5 microns, a lead content of about 0.15%, expressed as PbO, and a total sulfur content of from 0.3 to 0.4%, expressed as $SO_3$. More specifically, the present invention contemplates the provision of dried, uncalcined coprecipitated zinc sulfide and barium sulfate, for use in reinforcing rubber, whose capacity for imparting to compounded rubber resistance to abrasive wear is substantially superior to, and preferably at least 50% greater than, that of Special Grade Horsehead Brand zinc oxide. A further aspect of the invention contemplates the provision, as a rubber reinforcer, of a dried chemical precipitate, such as the aforementioned coprecipitated zinc sulfide and barium sulfate, and having a capacity for imparting to compounded rubber resistance to abrasive wear comparable and preferably superior to that of the best grades of rubber reinforcing zinc oxide manufactured to-day. The present invention also contemplates the production of an improved compounded rubber containing or reinforced with the new rubber reinforcer of the invention, as well as the methods of making the new rubber reinforcer and of compounding rubber therewith.

The rubber reinforcing or strengthening power of an agent is determined by rubber technologists in various ways, such as the tensile strength and elongation, tensile product (elongation multiplied by tensile strength), slope of the stress-strain curve, the so-called energy of resilience and the relative resistance to abrasive wear under standard conditions. Of these criteria for determining the reinforcing or strengthening power of a substance in compounded rubber, resistance to abrasive wear under standard conditions appears to check best with conditions encountered in actual practice, and this is especially true in the case of vehicle tire compounds.

The resistance to abrasive wear of compounded rubber has heretofore been commonly measured by manufacturing a vehicle tire with two or more kinds of rubber stock forming separate segments of the tread. This tire is then placed in actual use and the relative rates of wear of the several segments observed and measured. In order to avoid the cost and to shorten the time required for such actual service tests, factory methods of determining the relative abrasive resistance of compounded rubbers have been devised. One such factory method consists in subjecting the several pieces of compounded rubber to the abrasive action of a revolving sharp sand concrete track and comparing the relative volume losses after a predetermined time.

The numerical and comparative figures for resistance to abrasion (abrasive indices) given herein have been determined on an abrasion machine of the following design. The machine consists essentially of a revolving sharp sand concrete ring or annular track several feet in diameter and two or three times as wide as the specimens to be abraded. The compounded rubber specimens to be abraded are held stationary with respect to the revolving track in a clamp which fastens but one end of the specimen and allows the greater portion of the specimen to lie flat on the abrading track under the weight of the clamp, which is constant. The clamp is free to move vertically to take care of unevennesses in the track. The track is kept clear of abraded rubber by any convenient means, such as brushes or suction, and is rotated at such a speed (about 30 R. P. M.) that approximately 0.18 cubic inches of rubber are abraded from an area of 4 square inches under a pressure of 13 ounces per square inch for 1000 revolutions of the track from a properly vulcanized specimen of rubber stock compounded with the aforementioned Special Grade Horsehead Brand zinc oxide in accordance with the composition given below:

| | Grams. |
|---|---|
| First latex pale crepe (washed and dried) | 920 |
| Sulfur | 55 |
| Hexamethylenetetramine | 6 |
| Zinc oxide | 1260 |
| | 2241 |

The crude rubber is first treated on the milling rolls, and when appropriately broken down, the other ingredients of the composition are worked therein. After this mixture has been appropriately worked on the milling rolls to thoroughly incorporate all of the ingredients uniformly throughout the crude rubber, the resulting product is allowed to stand for an appropriate period of time, usually 24 hours or so, and is then put into a vulcanizer and vulcanized at the appropriate temperature and for the appropriate period of time to secure the optimum cure.

The figures for relative abrasion resistance of different rubber stocks as determined on the aforementioned factory machine have been found to check up very closely with the relative abrasion resistances of those same stocks when put on as segments of a vehicle tire and subjected to actual service wear. In using the factory machine, the volume losses of the rubber specimens are determined by the losses in weight of the specimens divided by their respective specific gravities. Since the volume loss of a specimen varies inversely as its resistance to abrasive wear, it is customary to indicate the abrasive resistance as the reciprocal of the volume loss, and this practice has been followed in the determination of the numerical and comparative values for abrasion resistance given herein.

As a specific example of the present invention, we will describe what we now regard as the best embodiment thereof, and in this connection will describe the manufacture and characteristic properties of our present preferred rubber reinforcing agent comprising coprecipitated zinc sulfide and barium sulfate.

The coprecipitation of zinc sulfide and barium sulfate results from the mixing of solutions of barium sulfide and zinc sulfate. In practice, the zinc sulfate solution is first run into a precipitating vat, and the barium sulfide solution is then slowly added to the precipitating vat and the reaction mass thoroughly stirred for an appropriate period of time, usually about one hour, to complete the chemical reactions involved. It has been our experience that the precipitation is more satisfactorily effected if conducted in the presence of some electrolyte, such as a soluble chloride, sulfuric acid, or the like. Thus, for example, we have secured excellent results by employing a zinc sulfate solution of 20° Baumé containing a soluble chloride in amount equivalent to from 0.1 to 2 grams (and preferably about 1 gram or slightly less) of chlorine per liter. The barium sulfide solution may conveniently be of about 12° Baumé.

The resulting coprecipitate of zinc sulfide and barium sulfate is thoroughly washed to remove as completely as possible all traces of water soluble salts. In this connection, it is important to remove as completely as possible all traces of zinc sulfate, because zinc sulfate is a retarder in the vulcanization of rubber. The thoroughly washed coprecipitate needs to be only dried and disintegrated in order to prepare it for use as a rubber reinforcing agent of the invention.

In our preferred practice, the thorough washing of the coprecipitate is accomplished by repeated filtering followed by trituration of the filter-cake with fresh water in pebble mills, beaters, or the like. The thoroughly washed product, after the final filtering, may be dried in air or in an atmosphere of dry steam, but such heat treatment as the coprecipitate receives in the course of this drying should involve subjecting the coprecipitate to no temperature exceeding 400° C. We have secured very satisfactory results by drying the coprecipitated zinc sulfide and barium sulfate at a temperature approximating 90° C. and not exceeding 110° C; the coprecipitate being supported on shallow trays and dried by heated air currents in a tunnel-type drier.

The drying temperature is a very important factor in the manufacture of our improved rubber reinforcing agent, and it is of the utmost importance that the drying temperature when air is present should not exceed around 125° C. When the coprecipitated zinc sulfide and barium sulfate is dried at temperatures above 125° C. in the presence of oxidizing influences, such as air, sulfates and particularly water soluble sulfates are formed. In the vulcanization of rubber, the presence of water soluble sulfates retards the cure, and on this account it is important in the production of the rubber reinforcers of the invention that conditions conducive to the formation of water soluble sulfates be carefully avoided.

The coprecipitated zinc sulfide and barium sulfate, after the final filtering, may be dried at temperatures higher than 125° C. if oxidizing influences are excluded. For example, where the drying of the coprecipitate is conducted in an atmosphere of steam, generated either without the drying chamber or within the drying chamber by the dehydration of the coprecipitate itself, temperatures up to 400° C. may be employed.

As the result of our researches and investigations, we have discovered that in heating coprecipitated zinc sulfide and barium sulfate to temperatures above 400° C., and more especially to temperatures in the neighborhood of 600° C. and higher as is the customary practice in the manufacture of lithopone, even in the absence of oxidizing influences, the rubber reinforcing properties of the coprecipitate rapidly depreciate, which depreciation we now attribute to the very appreciable increase in the average particle size of the coprecipitate which takes place when the coprecipitate is heated to temperatures above 400° C. Thus, we have found that the heating of coprecipitated zinc sulfide and barium sulfate to temperatures above 400° C. produces such an increase in the average particle size and such an impairment of the rubber reinforcing properties of the coprecipitate as to take the resulting product out of the class of rubber reinforcing agents herein claimed. Accordingly, while we have succeeded in producing an improved rubber reinforcer of the character hereinbefore specified by drying coprecipitated zinc sulfide and barium sulfate at temperatures approximating the aforementioned upper limit of 400° C. in the absence of non-oxidizing influences, it is our preferred practice to dry the coprecipitate in air at temperatures not exceeding around 125° C.

After drying, the coprecipitated zinc sulfide and barium sulfate is in the form of lumps of varying sizes. The final step in preparing the coprecipitated zinc sulfide and barium sulfate as a rubber reinforcer of the invention consists in disintegrating the lumpy product resulting from the drying operation. This disintegration may conveniently be carried out in a cage disintegrator, for example, of the well known Stedman type. Thorough disintegration is important and we find that the material should be passed several times through the disintegrator in order to effect as complete disintegration and pulverization of the product as possible.

In manufacturing compounded rubber the improved reinforcing agents of the invention may be employed in substantial accordance with the present prevailing practice. Thus, the crude rubber is treated on the milling rolls, and when appropriately broken down, suitable amounts of reinforcing agent, sulfur and accelerator, are worked into the crude rubber. This operation of incorporating the improved reinforcing agents of the invention into the crude rubber usually takes a somewhat longer time than at present necessary when using zinc oxide as the reinforcing agent.

After the reinforcing agent has been properly worked into the crude rubber, the mixture is allowed to stand for an appropriate period of time, usually 24 hours or so, and is then put into a vulcanizer and vulcanized at the appropriate temperature and for the appropriate period of time to secure the optimum cure.

Compounded rubber reinforced with coprecipitated zinc sulfide and barium sulfate prepared as hereinbefore described possesses superior resistance to abrasive wear than compounded rubber reinforced with an equivalent amount of Special Grade Horsehead Brand zinc oxide. The improved capacity of this coprecipitated zinc sulfide and barium sulfate for imparting to compounded rubber resistance to abrasive wear is indicated in the four following determinations in which a high grade lithopone, Special Grade Horsehead Brand zinc oxide, high grade carbon gas black, and coprecipitated zinc sulfide and barium sulfate of the invention were employed as reinforcers in the compounded rubber used in determinations Nos. 1, 2, 3 and 4, respectively. The composition of the compounded rubber used in these determinations is given in the following table:

| Determination No. | (1) | (2) | (3) | (4) | Density. |
|---|---|---|---|---|---|
| Rubber | 920 | 920 | 920 | 920 | |
| Sulfur | 55 | 55 | 55 | 55 | |
| Hexamethylenetetramine | 6 | 6 | 6 | 6 | |
| Lithopone | 777 | | | | 4.2 |
| Zinc oxide | | 1,260 | 224 | 224 | 5.6 |
| Gas black | | | 320 | | 1.73 |
| Coprecipitated zinc sulfide and barium sulfate | | | | 777 | 4.2 |
| % volume of reinforcing agent | 22.5 | 22.5 | 22.5 | 22.5 | |

DETERMINATION NO. 1—LITHOPONE.

| Time of cure. | Tensile strength. | Per cent elongation. | Relative abrasion resistance. | Relative heating up. |
|---|---|---|---|---|
| 45 min | 2958 | 684 | | |
| 60 min | 3080 | 665 | 45 | |
| 75 min | 3058 | 647 | 74 | 40° C. |
| 90 min | 3213 | 636 | 83 | |
| 105 min | 3155 | 618 | | |

DETERMINATION NO. 2—ZINC OXIDE.

| | | | | |
|---|---|---|---|---|
| 45 min | 2980 | 657 | 56 | |
| 60 min | 3015 | 622 | 71 | |
| 75 min | 3095 | 619 | 81 | |
| 90 min | 3240 | 625 | 101 | 36° C. |
| 105 min | 3425 | 623 | 117 | |
| 120 min | 3048 | 602 | 124 | |

DETERMINATION NO. 3—GAS BLACK.

| | | | | |
|---|---|---|---|---|
| 45 min | 2955 | 567 | | |
| 60 min | 3162 | 567 | 149 | |
| 75 min | 3315 | 537 | 180 | 54° C. |
| 90 min | 3583 | 547 | 220 | |
| 105 min | 3670 | 539 | | |

DETERMINATION NO. 4—COPRECIPITATED ZINC SULFIDE AND BARIUM SULFATE.

| Time of cure. | Tensile strength. | Per cent elongation. | Relative abrasion resistance. | Relative heating up. |
|---|---|---|---|---|
| 45 min | 3235 | 614 | 174 | |
| 60 min | 3655 | 622 | 220 | |
| 75 min | 3430 | 605 | 244 | 41° C. |
| 90 min | 3417 | 601 | 220 | |
| 105 min | 3200 | 591 | 245 | |
| 120 min | 2962 | 567 | 265 | |

In the foregoing determinations, the correct time of the cures to compare is not easy to choose but would be about 90 minutes in Determination No. 1, about 105 minutes in Determination No. 2, about 90 minutes in Determination No. 3 and about 75 minutes in Determination No. 4. The abrasive indices in the four determinations would then be about 83, 117, 220 and 244, respectively. In other words, the particular compounded rubber of the invention employed in making Determination No. 4 has a resistance to abrasive wear approximately 100% greater than the compounded rubber reinforced with Special Grade Horsehead Brand zinc oxide employed in making Determination No. 2, and comparable to that of the compounded rubber reinforced with high-grade gas black employed in making Determination No. 3. It will furthermore be noticed that the heating up effect of compounded rubber reinforced with coprecipitated zinc sulfide and barium sulfate is very materially lower than the heating up effect of compounded rubber reinforced with gas black.

Coprecipitated zinc sulfide and barium sulfate, produced in the manner hereinbefore described as a rubber reinforcing agent, is characterized by an extremely fine particle size. The best commercial grades of rubber reinforcing zinc oxide which we have examined have an average particle size of from about 0.36 to about 0.52 microns; the aforementioned Special Grade Horsehead Brand zinc oxide having an average particle size of about 0.40 microns. A micron is 0.001 millimeters. When produced under favorable conditions by the hereinbefore described procedure, the coprecipitated zinc sulfide and barium sulfate of the invention has an average particle size not exceeding 0.30 microns and when due regard is paid to all of the aforementioned precautions, we have succeeded in producing a coprecipitated zinc sulfide and barium sulfate product of such fineness that the diameter of the average particle is below the resolving power of the microscopical equipment hereinafter described, which is approximately 0.25 microns.

The definition and determination of the particle size of satisfactory rubber reinforcing agents is rendered difficult because of the extreme fineness of the particles of such substances. For example, a zinc oxide, the particles of which have an average diameter of 0.4 microns, will consist of over five trillions (5,000,000,000,000) of particles per gram. Throughout this specification and the appended claims, when we speak of "particle size", we mean the diameter of the average particle. Thus, where it is herein stated that a particular substance has an average particle size of 0.40 microns, it is meant that this numerical figure is the diameter in microns of the average particle. One may speak definitely of the diameter of a sphere, in the case of a pound of fine spherical shot, each shot equal in regard to volume, then if the diameter of one shot is known, it can be stated that the length of this diameter is the particle size of the entire pound of material. However, in the case of rubber reinforcing agents, we are dealing neither with spheres nor with a substance whose particles are perfectly uniform, and hence the meaning of "particle size" is less definite than in the case of uniform spheres. For the purposes of this specification and the appended claims, we will define the diameter of a particle as the harmonic mean of the three cubical dimensions which is derived from measurements of the three cubical dimensions. The numerical values of particle size (diameter of the average particle) given in this specification have been determined by photomicrographing with blue light (with a 2 millimeter homogeneous immersion apochromatic lens of 1.3 numerical aperture and at a magnification of 1500 diameters) specimens which have been properly dispersed in glycerine. These determinations have been made in accordance with the procedure described in the paper by Henry Green, Journal of the Franklin Institute, November, 1921, page 637-666.

The effect of decreasing the particle size of rubber reinforcers, such as zinc oxide, by as little as one tenth of a micron will be best appreciated from the following table which indicates the number of particles per gram in trillions of zinc oxides of average particle sizes ranging from 0.7 to 0.1 microns:

| Diameter in microns | Number of particles per gram in trillions |
|---|---|
| 0.7 | .96 |
| 0.6 | 1.54 |
| 0.5 | 2.64 |
| 0.4 | 5.17 |
| 0.3 | 12.24 |
| 0.2 | 41.40 |
| 0.1 | 331.20 |

While, in the light of the information derived from our researches and investigations, we attribute, in part at least, the improved reinforcing power of the rubber reinforcers of the invention to their great degree of subdivision or fineness of particle size, we do not wish to restrict ourselves to this explanation or interpretation of the superior capacities of these agents of the invention for imparting to compounded rubber resistance to abrasive wear. The chemical and physical properties of satisfactory rubber reinforcers appear to be so intimately associated that in attributing the improved reinforcing power of the agents of the invention to particle size, we may be attributing this improved property to simply one of the manifestations of a cause and not to the cause itself.

We claim:—

1. As a new article of manufacture, a reinforcing agent for compounded rubber comprising dried coprecipitated zinc sulfide and barium sulfate having the capacity of imparting to compounded rubber a resistance to abrasive wear materially superior to that of Special Grade Horsehead Brand zinc oxide.

2. As a new article of manufacture, a reinforcing agent for compounded rubber comprising dried coprecipitated zinc sulfide and barium sulfate having the capacity of imparting to compounded rubber a resistance to abrasive wear at least 50% greater than that of Special Grade Horsehead Brand zinc oxide.

3. As a new article of manufacture, a reinforcing agent for compounded rubber comprising dried and uncalcined coprecipitated zinc sulfide and barium sulfate of an average particle size not exceeding 0.3 microns.

4. As a new article of manufacture, a reinforcing agent for compounded rubber comprising dried coprecipitated zinc sulfide and barium sulfate of an average particle size not exceeding 0.3 microns and having the capacity of imparting to compounded rubber a resistance to abrasive wear at least 50% greater than that of Special Grade Horsehead Brand zinc oxide.

5. As a new article of manufacture, a reinforcing agent for compounded rubber comprising dried and uncalcined coprecipitated zinc sulfide and barium sulfate.

6. Compounded rubber reinforced with dried coprecipitated zinc sulfide and barium sulfate and having a resistance to abrasive wear materially superior to compounded rubber of a similar composition containing in lieu of the aforesaid coprecipitate an equivalent amount by volume of Special Grade Horsehead Brand zinc oxide.

7. Compounded rubber reinforced with dried coprecipitated zinc sulfide and barium sulfate and having a resistance to abrasive wear at least 50% greater than compounded rubber of a similar composition containing in lieu of the aforesaid dried coprecipitate an equivalent amount by volume of Special Grade Horsehead Brand zinc oxide.

8. Compounded rubber containing as a reinforcing agent therein dried and uncalcined coprecipitated zinc sulfide and barium sulfate of an average particle size not exceeding 0.3 microns.

9. Compounded rubber containing as a reinforcing agent therein dried coprecipitated zinc sulfide and barium sulfate of an average particle size not exceeding 0.3 microns and having a resistance to abrasive wear at least 50% greater than compounded rubber of a similar composition containing in lieu of the aforesaid coprecipitate an equivalent amount by volume of Special Grade Horsehead Brand zinc oxide.

10. Compounded rubber containing as a reinforcing agent therein dried and uncalcined coprecipitated zinc sulfide and barium sulfate.

11. The method of preparing a reinforcing agent for compounding rubber, which comprises drying a coprecipitate of zinc sulfide and barium sulfate at a temperature below that at which appreciable increase in particle size takes place, and completing the preparation of the thus dried coprecipitate without further heat treatment.

12. The method of preparing a reinforcing agent for compounding rubber, which comprises drying a coprecipitate of zinc sulfide and barium sulfate at a temperature not exceeding 400° C., and completing the preparation of the thus dried coprecipitate without further heat treatment.

13. The method of preparing a reinforcing agent for compounding rubber, which comprises drying a coprecipitate of zinc sulfide and barium sulfate at a temperature not exceeding 125° C., and completing the preparation of the thus dried coprecipitate without further heat treatment.

14. The method of compounding rubber which comprises, adding as a reinforcing agent an uncalcined coprecipitate of zinc sulfide and barium sulfate which has been dried at a temperature below that at which appreciable increase in particle size takes place.

15. The method of compounding rubber which comprises, adding as a reinforcing agent an uncalcined coprecipitate of zinc sulfide and barium sulfate which has been dried at a temperature not exceeding 400° C.

16. The method of compounding rubber which comprises, adding as a reinforcing agent an uncalcined coprecipitate of zinc sulfide and barium sulfate which has been dried at a temperature not exceeding 125° C.

17. The method of compounding rubber which comprises, adding as a reinforcing agent a coprecipitate of zinc sulfide and barium sulfate which has been dried at a temperature below that at which appreciable increase in particle size takes place, the particles of said dried coprecipitate not exceeding an average particle size of 0.3 microns.

In testimony whereof we affix our signatures.

FRANK G. BREYER.
CLAYTON W. FARBER.